Feb. 22, 1966 G. R. TRAUT 3,236,714
METHOD OF AND APPARATUS FOR PRODUCING
REINFORCED SHEET MATERIAL
Filed Oct. 9, 1962 2 Sheets-Sheet 2
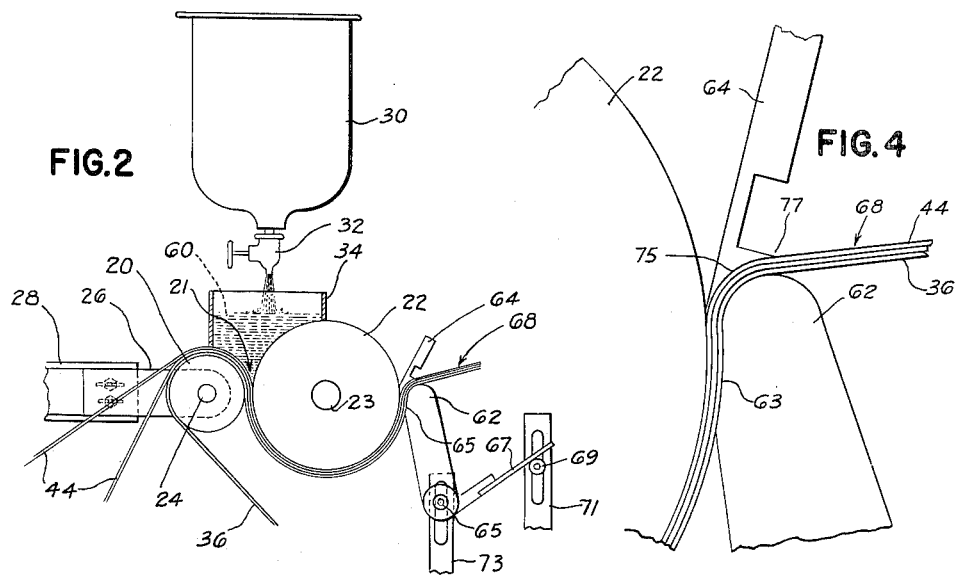
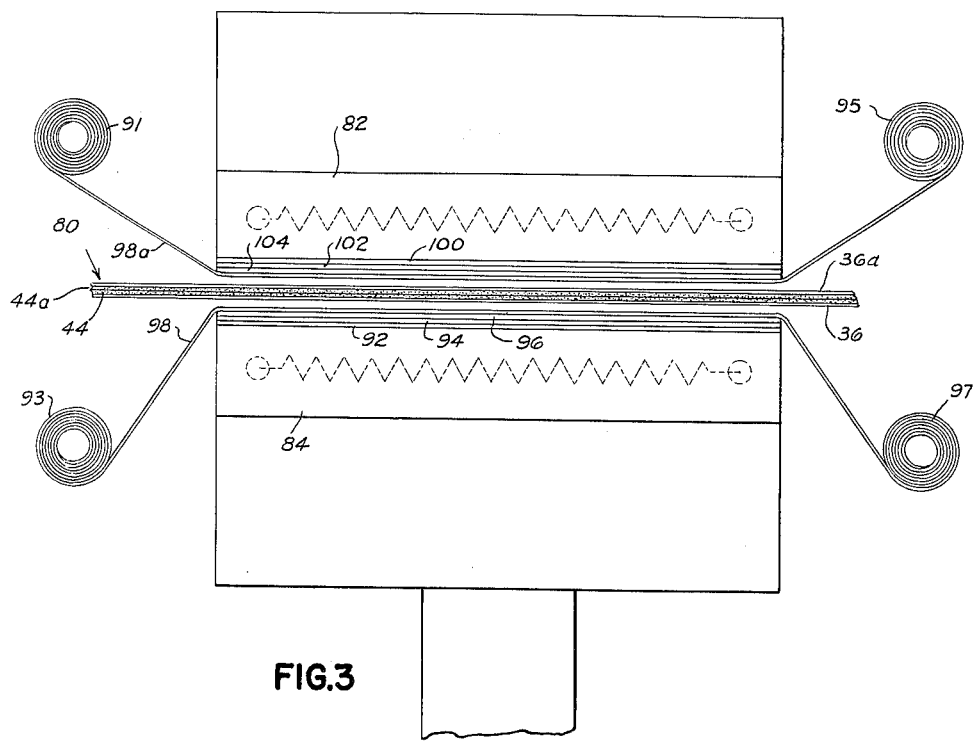
INVENTOR.
G. R. Traut
BY
Robert R. Churchill
ATTORNEY

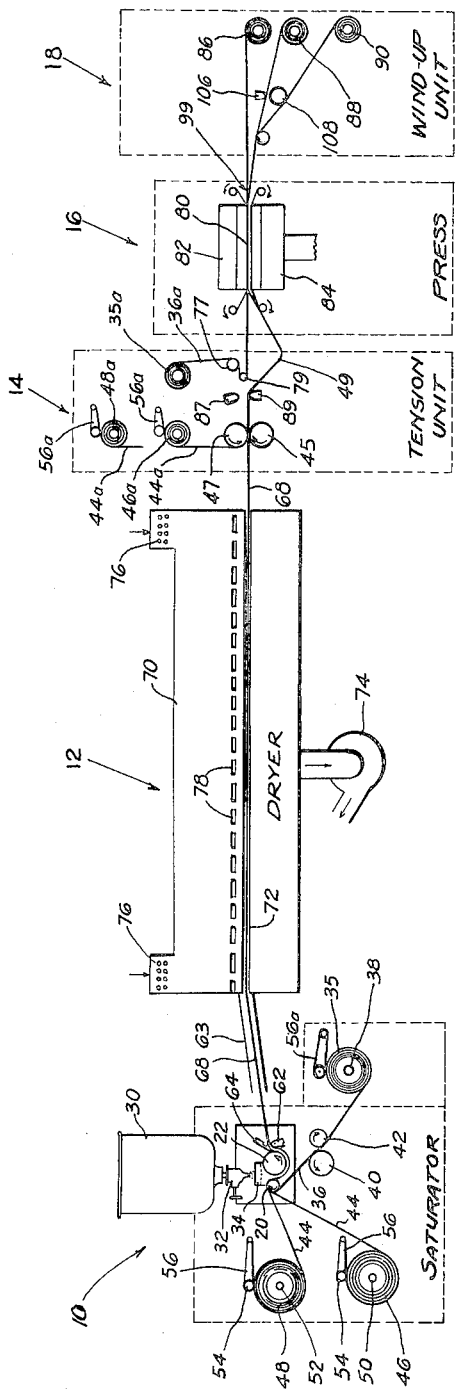

United States Patent Office 3,236,714
Patented Feb. 22, 1966

3,236,714
METHOD OF AND APPARATUS FOR PRODUCING REINFORCED SHEET MATERIAL
George R. Traut, Danielson, Conn., assignor to Rogers Corporation, Rogers, Conn., a corporation of Massachusetts
Filed Oct. 9, 1962, Ser. No. 229,325
17 Claims. (Cl. 156—307)

This invention relates to a method of and apparatus for producing reinforced sheet material.

The invention has for an object to provide a novel and improved method of producing reinforced sheet material in a continuous strip whereby a superior product may be produced in a simple and economical manner.

The invention has for a further object to provide novel and improved apparatus for combining a saturant with reinforcing webs to produce reinforced sheet material in a novel and economical manner.

A still further object of the invention is to provide novel and improved apparatus of the character specified which includes means for densifying sheet material in continuous lengths.

With these general objects in view and such others as may hereinafter appear, the invention consists in the method of and apparatus for producing reinforced sheet material and in the various structures, arrangements and combinations of parts hereinafter described and particularly defined in the claims at the end of this specification.

In the drawings illustrating the preferred embodiment of the invention:

FIG. 1 is a diagrammatic view of apparatus for practicing the present method of producing reinforced sheet material;

FIG. 2 is a detail view, partly in cross section, of the novel saturating mechanism;

FIG. 3 is a detail view in side elevation of the press mechanism for effecting thermosetting of the reinforced saturated structure to produce the reinforced sheet material; and FIG. 4 is a detail view at an enlarged scale of a portion of the saturating mechanism.

In general the present invention contemplates a novel method of and apparatus for producing reinforced sheet material. For the purpose of illustration, but not by way of limitation, the present method and apparatus has been illustrated and described as a method and apparatus for producing sheet material embodying electrical insulating properties. One form of sheet insulation produced by the present method may be composed of epoxy resin, filler and polyester fiber reinforcement, and in general, in accordance with the present method, the illustrated apparatus is adapted to combine the compounded epoxy resin saturant with the polyester fiber reinforcing sheet, remove the solvents, and densify and thermoset the reinforced epoxy resin structure to produce a continuous web of sheet insulation which may be wound in a coil.

In accordance with one feature of the present invention one or more continuous webs of reinforcing material supported by a lower carrier sheet is passed into the nip of a pair of rolls, one of which may be referred to as the saturating roll, the other roll comprising a doctor roll, forming a part of the saturating mechanism. The saturant is applied to the surface of the reinforcing web as it passes between the rolls and is forced into the reinforcing web by the pressure of the rolls. The amount of saturant applied to the web is accurately controlled by adjustment of the nip gap setting between the rolls. The web then passes around the underside of the saturating roll, and provision is made for scraping the saturating roll to remove the saturated web therefrom and to maintain the upper portion of the roll clean and free of saturant, thus further assuring uniformity in the amount of saturant applied to the reinforcing web.

This novel method of saturation provides excellent control of final thickness of the product under widely varying conditions, such as: when the desired percentage of saturant is greater by volume than the reinforcing web; when the reinforcing web may be susceptible to weakening of its binder by saturant solvent; when the saturant is thixotropic and/or viscous; when the saturant may vary in thixotropicity or viscosity during a run; when the reinforcing web may vary in density and/or thickness during a run; when the speed or tension of the reinforcing web may be varied during a run; and when the reinforcing web may need to be spliced before saturation by a lap joint to prevent discontinuity of the product. This saturation technique leaves a minimum of parts to be cleaned after a run.

In one form of the invention the saturated web is then guided through a dryer for removing the solvents from the saturant. Thereafter, one or more additional reinforcing webs may be applied to the saturated upper surface of the first web or webs, and an upper carrier sheet is applied over the added webs preparatory to passing the assembly between heated pressure plates wherein the assembly is densified and thermoset to produce a uniform insulating sheet. Thereafter, the carrier sheets are removed from the assembly. During the pressing operation the saturant, with the solvent removed by the dryer, distributes itself uniformly throughout the various plies of the reinforcing webs, including those webs which are passed through the saturator and those applied after the drying operation, the thermosetting operation forming a dense electrical insulating sheet.

From the description thus far it will be seen that in accordance with one form of the present method one or more reinforcing webs are passed through the saturator and then passed through the dryer to remove the solvents from the saturant before additional reinforcing webs are applied to the assembly. This feature of applicant's invention is conducive to the production of insulating sheets free of voids and of excellent dielectric strength. It was found in practice that when all of the reinforcing webs to be used were passed through the saturator, air and vapors were not as readily vented from the assembly during the pressing operation, and as a result the product contained voids, usually microscopic in size, which lead to poor dielectric strength.

Referring now to the drawings, in general the present apparatus for producing sheet insulation in accordance with the present method includes a saturating device indicated generally at 10; a dryer unit indicated generally at 12; a tensioning unit indicated at 14; a press unit indicated at 16 and a windup unit indicated generally at 18.

As illustrated in detail in FIG. 2, the saturating unit 10 includes a pair of spaced cooperating rolls 20, 22. The roll 22, comprising the saturating roll is mounted fast on a driven shaft 23. The roller 20, comprising the doctor roll, is mounted for rotation on a shaft 24 carried by an arm 26 which is adjustably secured to a bracket 28 to vary the nip gap between the rollers. A saturant container 30 is mounted above the nip between the rollers 20, 22 and is provided with a dispensing valve 32 to control the release of saturant from the container into a dam 34 arranged to confine the saturant flow into the nip of the rollers. The marginal edges of the dam 34 ride on the surface of the saturating roll 22 and on the surface of the reinforcing web 44 so that a substantial area above the web supported on the doctor roll and above the saturating roll is flooded by the saturant. A continuous coil 35 of a suitable carrier sheet 36 is supported on a mandrel 38 under suitable tension and is threaded between metering rolls 40, 42, over the doctor roller 20 and under the saturating roller 22 as shown. One of the metering rolls 40 is driven and provided with an abrasive surface to prevent slipping of the sheet. The other roll 42 comprises a pinch roll which may be resiliently urged into cooperating engagement with the driven roll.

In practice the carrier sheet 36 may comprise a commercially available silicone treated sulphite release paper, about .004" thick, and in operation, when the carrier sheet is unwound from the supply roll 35, any braking device, such as weighted arms 54, may be used to provide suitable tension to control the unwinding operation. The metering rolls 40, 42 may also be simultaneously adjusted vertically at one end to guide the sheet straight to doctor roll 20. The speed of the driven rolls 22, 40 may be varied by the operator to determine the rate of feed of the material through the apparatus. As herein illustrated, the saturated material, after passing through the saturator, is maintained under a constant, uniform tension by a pair of tensioning rolls 45, 47 forming a part of the tensioning device 14 disposed beyond the dryer 12.

The reinforcing web used in the production of the sheet insulation may comprise a web of fiber, such as "Dacron," formed into a continuous coil of non-woven fabric. The reinforcement comprising one or more webs 44 may be withdrawn from supply rolls 46, 48 and superimposed on the carrier sheet 36 to pass into the nip of the rollers 20, 22 and to then pass under the saturating roll 22 with the carrier sheet 36. The supply rolls 46, 48 may be mounted to rotate freely on mandrels 50, 52, and in order to maintain a constant tension regardless of roll diameter or speed, a friction brake bar 54 is mounted on pivoted arms 56 so that its weight is applied constantly to the top of its respective supply roll 46, 48.

In one embodiment of the invention the saturant employed in producing sheet insulation comprises epoxy resin, curing agents, accelerator, flow controlling filler, and solvent which may be combined by a planetary type dough mixer to prepare the saturant 60 which is deposited in the container 30. The metering valve 32 may be adjusted to control the release of saturant into the dam 34, which latter is arranged to confine the saturant to cause it to flow onto the surface of the reinforcement and between it and the saturating roll. In operation the carrier sheet with the reinforcement passes through the nip gap 21 between the rolls 20, 22, and at this point the epoxy resin saturant on the nip is forced into the reinforcement. The amount of saturant forced into the reinforcement is controlled by adjustment of the doctor roll 20 to adjust the nip gap setting. The lower edges of the dam 34 closely conform to the shape of the rolls 20, 22 to prevent the saturant from running off the marginal edges of the reinforcement. The saturating roll 22 is driven at the same peripheral speed as the metering roll 40.

The assembly, comprising the carrier sheet 36, reinforcement 44 and the saturant 60, is held firmly against the underside of the saturating roll 22 by means of the tension provided by the tensioning rolls 45, 47 and by means of a curved shoe 62 which may be held against the roll 22 by adjustable spring pressure and which may also be positively adjustable vertically. Cooperating with the shoe 62 is a scraper blade 64 which engages the roll 22 immediately above the shoe and which effects removal of the composite web comprising the carrier sheet, reinforcing sheet and all of the saturant from the roll. Failure to remove all saturant from the roll 22 during each revolution would eventually result in a build-up of dried saturant, especially the filler component of the saturant which would result in a reduced nip gap. As illustrated, the scraper blade 64 is recessed to provide a trailing edge 77 with an acute angle. This sharp edge 77 tends to prevent build-up of the saturant which would otherwise fall off and form lumps in the product.

In practice the cooperation of the shoe 62 with the saturating roll 22 and with the scraper blade 64 is an important feature of the present invention to provide a clean and uniform separation of the material as it is removed from the saturating roll. As illustrated in detail in FIGS. 2 and 4, the shoe 62 is provided with a curved surface 63 which conforms to the curvature of the saturating roll and is arranged to resiliently bear against the carrier sheet 36 and the saturated material 44 with adjustable pressure to hold the assembly against the saturating roll until it is removed by the scraper blade 64. The shoe may be pivotally mounted at 65, and an elongated resilient arm 67 formed integrally therewith may bear against a stop member 69 adjustable vertically in a slotted bracket 71. The pivot 65 of the shoe 62 is also arranged to be adjusted vertically in a slotted bracket 73 to adjust the gap between the rounded upper surface of the shoe and the curved surface 75 of the scraper blade 64 to permit travel of the material between the blade and the upper end of the shoe. In this manner the saturated material may be cleanly removed to maintain the uniform thickness provided at the nip of the rolls. As illustrated in detail in FIG. 4, the sharp trailing edge 77 of the portion of the blade cooperating with the rounded end of the shoe prevents any accumulation of the saturant on the blade.

The assembly comprising the carrier sheet 36 and the saturated reinforcement 44, indicated by the numeral 68, is drawn through the dryer tunnel 70 by tension provided by the tensioning rolls 45, 47. The tensioning roll 45 may be driven by a slip clutch, not shown, and the roll 47 may comprise a free-turning pressure roll. The web assembly 68 scraped from the roll 22 and guided over the curved end of the shoe 62 passes through the entry chute 63 and into the dryer tunnel 70 as shown. The web assembly 68 slides upon a supporting surface 72, and drying is effected by movement of air at controlled temperature to prevent excessive curing of the resin. The slide surface 63 is preferably less in width than the overlying portion 70 of the dryer. As herein shown, a blower 74 is arranged to exhaust air and vapor from the dryer. Make-up air enters the dryer principally through controlled steam heated coils 76 and is diffused against the web assembly 68 by air flow diffusers 78. The air then passes around the supporting surface 72 and into the lower part of the tunnel toward the exhaust blower 74. Some make-up air enters through the entry chute 63 and helps remove fumes from the work area. The illustrated dryer is capable of preventing any of the fumes and vapor from coming into contact with the operator. As shown, the dryer tunnel tends to draw air into itself rather than leak out fumes through any imperfections.

Referring now to the tensioning unit 14, one or more layers of additional unsaturated reinforcement 44a is laid on top of the saturated web assembly 68 and fed between the tensioning rolls 45, 47. The reinforcement 44a is withdrawn from supply rolls 46a and 48a and is maintained under constant tension by the weighted arms 56a. An upper carrier sheet 36a withdrawn from a supply roll 35a and passed around guide rolls 77, 79 is also applied over the additional reinforcement 44a prior to entering the press, and the whole assembly, indicated by the numeral 80, is drawn into the hydraulic press 16 between the upper and lower platens 82, 84 by tension provided by the windup unit 18 which includes a top carrier sheet windup roll 86, insulating reinforcement windup roll 88 and bottom carrier sheet windup roll 90 as illustrated. The windup rolls may be mounted on mandrels and may be clutch or slip belt driven to maintain the material under constant tension.

In operation the hydraulic press 16 may be timer controlled to remain closed for a predetermined time, and when the press is opened the lower platen 84 trips a reset switch starting the cycle again in a conventional manner. Thus, the web assembly 80 to be pressed is advanced by the continuous tension of the windup unit 18 as far as possible each cycle of operation. While the press is closed the tensioning rolls 45, 47 continue to feed material for the next cycle, such material forming a loop 49 between the tensioning unit 14 and the press unit 16. The amount or length of web 85 intermittently fed into the press during each cycle is determined by the length of the press cycle and the speed of the metering roll 40. Preferably, every section of assembly 80 receives five to six pressing cycles on its way through the press. The number of pressing cycles may be varied to obtain optimum production while maintaining suitable insulating properties. In order to prevent extra tension of the windup unit 18 from being transferred periodically to the web assembly 68 leading from the saturator, the web assembly is arranged to be clamped between pneumatically actuated upper and lower clamping bars 87, 89 disposed immediately beyond the tensioning rolls 45, 47. Pneumatic cylinders, not shown, operatively connected to the clamping bars 87, 89 may be arranged to effect closing of the clamping bars in response to opening of the press and, conversely, to effect opening of the clamping bars upon closing of the press by conventional control means, not shown. It will thus be seen that the web assembly 68 is continuously advanced through the saturator 10 and the dryer 12, and the reinforced web assembly 80 is moved intermittently through the press 16.

As illustrated in FIG. 3, the platens 82, 84 of the hydraulic press 12 for densifying and thermosetting the saturated material are specially clothed to provide uniform pressure distribution on a thin material and to provide the proper rate of temperature rise of material advancing through it. The lower electrically heated platen 84 is covered first with a reinforced thermoset plastic shim plate 92. The shim plate 92, which may be about ¼" thick, is molded into place in such a way that it conforms to the shape of the upper platen 82 when the operating pressure is applied. A relatively thin stainless steel plate 94, which may be about 1⁄32" thick, is laid over the shim plate 92 during its molding and remains to serve as a protection and holder for the shim. One or more relatively thin plies of rag or kraft paper board 96 are laid over the steel plate 94 to serve as a control on the temperature rise of the material being pressed. Over this is laid a lower secondary carrier sheet 98 which by being advanced very slightly during the pressing cycle serves to prevent a build-up of dirt or excess resin on the press surface. The upper electrically heated platen 82 is covered with several plies of thin kraft or rag board 100, stainless steel plate 102, one or more plies of heat resistant rubberized glass fabric 104 and an upper secondary carrier sheet 98a. The paper board 100 serves as a press pad for uniform pressing and also controls heat flow. The rubberized fabric 104 accommodates any small imperfections in the uniformity of the saturated material. The upper and lower secondary carrier sheets 98a, 98 may also comprise a silicone treated sulphite release paper, and, as herein shown, may be withdrawn from upper and lower supply rolls 91, 93 disposed on one side of the press and may be periodically advanced during the pressing cycle by upper and lower windup rolls 95, 97 disposed on the other side of the press.

After leaving the press 16 the densified and thermoset product is separated from the top and bottom carrier sheets 36, 36a. Carriers and product are separately wound onto windup rolls 86, 88, 90 as shown. Prior to being wound up, the completed product, indicated by the numeral 99, is passed between a dielectric test electrode bar 106 and a grounded roll 108. A potential of 3000 volts, A.C., is normally supplied to the electrode 106 from a circuit designed to safely limit current flow. Dielectrically weak areas are perforated by the potential and serve to indicate the quality of insulation material being produced.

It will be understood that the materials employed in the above-described method of making sheet insulation may comprise materials other than those specified. For example, the non-woven "Dacron" reinforcement may be replaced with other types of reinforcement, such as: woven fabrics of glass, "Dacron" and the like; lightly bonded blends of glass fiber and organic synthetic fibers; lightly bonded glass fiber papers; other synthetic organic or inorganic fiber structures; and open cell foamed sheeting.

It will also be understood that the epoxy resin formulation may be formulated to be B-stageable, and the saturated material merely densified at low temperature in the press to yield a densified prepreg, or a similar formulation may be used without densification.

Another variation in the materials employed may be similar to that above defined except that the epoxy resin saturant may be replaced with: polyester resin solution; compounded rubber in solvent vehicle; compounded rubber latex; phenol formaldehyde resin saturant; and the like. Also, the acrylic resin latex binder for the reinforcing webs may be replaced with other water dispersible or soluble binder materials. Furthermore, the saturation step may be eliminated, and a more heavily wet web saturated fiber sheet may be densified and thermoset in the press.

While the present invention has been illustrated and described as directed to the production of sheet insulation, it will also be understood that the present method and apparatus may find use in the production of other sheet materials. For example, a compounded rubber in latex or cement form combined with "Dacron" non-woven fabric may be used with advantage as a replacement for more costly rubberized fabrics in reinforced rubber parts, such as valve diaphragms or gaskets. The non-woven structure offers better utilization of fiber strength by allowing some freedom of fiber movement and provides better adhesion of fabrics to rubber. Also, a densified and B-stageable epoxy-glass fiber or epoxy-Dacron prepreg may be used with advantage in molded and etched circuit applications. A flame-retardant formulation of modified acrylic fiber and polyester fiber, wet web saturated with thermosettable soft acrylic resin latex binder, may be densified and thermoset to form thin flexible sheet insulation which may be used with advantage as a replacement for silicone or Teflon materials in electronic computers.

In another embodiment of the invention the addition of the unsaturated reinforcement may be eliminated, and the reinforcement may be covered with an upper carrier sheet prior to being advanced into the press.

In a further modified form of the invention the steps of superimposing the unsaturated reinforcement and top carrier sheets on the assembly of saturated reinforcement sheet and bottom carrier sheet after the assembly has left the dryer and prior to the pressing operation may be eliminated and the saturated reinforcement sheet and bottom carrier sheet assembly pressed to densify and cure the saturated reinforcement sheet.

A still further modified form of the invention contemplates the elimination of the step of applying the top carrier sheet. In this form of the invention the assembly of bottom carrier sheet and saturated reinforcement sheet is passed through the dryer and the unsaturated reinforcement sheet superimposed on the saturated reinforcement sheet and the composite assembly pressed to densify and cure the same.

It will be understood that in each of the above modified forms of the invention the steps of saturating, drying, pressing and the removal of the carrier sheets are the same as those described in connection with the preferred form of the invention. It will also be understood that in each of the above forms of the invention the step of removing either the top or bottom, or both, carrier sheets from the assembly after pressing may be eliminated, and either or both may become a part of the resultant reinforced sheet material. One or both of the carrier sheets may comprise thin copper foil and the resultant product produced by the present invention, a copper-clad laminated electrical insulation sheet.

In still another embodiment of the invention it may be desirable to use a saturant, such as a liquid epoxy resin, which contains no volatile solvent. In this event the reinforcement sheet is saturated and pressed, as described. However, the drying step is eliminated.

In the event that it is desired to produce a presaturated reinforcement, in accordance with the present invention, the reinforcement sheet is saturated with a resin having good "shelf life" characteristics and the presaturated assembly dried and stored until it is desired to complete the process.

From the above description it will be seen that the present method of and apparatus for producing sheet insulation has superior advantages over prior saturating processes in that it permits versatility in formulation, including the following: a wide range of usable saturant viscosities permits addition of fillers for cost reduction and also permits high resin solids content for solvent economies; the in-line saturation drying and press curing feature permits the formulation of fast curing resin systems without regard to pot life or shelf life; the present method permits saturation of low cost fiber structures which are too flimsy, especially on exposure to solvent, to be saturated by other means. The present method of producing sheet insulation is also of advantage in that there is better control of thickness of the product than is possible in conventional saturation and laminating processes. Also, the present method of saturation is much less messy and is easier to clean up than the dip saturation method. While similar products with inferior properties and less uniformity may be produced by other means with higher material costs, the present method and apparatus are adapted to economically produce a superior sheet insulation with a relatively low investment in equipment.

While the preferred embodiment of the invention has been herein illustrated and described in connection with the production of electrical insulation in sheet form, it will be understood that reinforced sheet materials for other purposes may be produced and that the invention may be embodied in other forms within the scope of the following claims.

I claim:

1. A method of making sheet material which comprises continuously advancing a reinforcement sheet into the nip of a pair of rollers, flooding a saturant containing solvents into and above the nip of the rollers to be forced into the reinforcement sheet by the pressure of the rollers, passing the saturated reinforcement sheet through a dryer to remove the solvents from the saturant, applying a second reinforcement sheet on top of the saturated reinforcement sheet, and then cyclically applying heat and pressure to successive portions of the assembly in a manner to provide each successive portion with a plurality of applications of heat and pressure to cause the saturant to distribute itself uniformly and to effect uniform and complete curing thereof.

2. A method of producing a continuous strip of sheet material which comprises the steps of continuously advancing a continuous reinforcement sheet supported by a carrier sheet into the nip of a pair of rollers, flooding a compounded epoxy resin saturant onto one surface of the reinforcement sheet supported on one roller and between the reinforcement sheet and the cooperating roller to be forced into the reinforcement sheet by the pressure of the rollers, controlling the amount of saturant forced into the reinforcement by adjustment of the nip gap setting, drying the saturated reinforcement and carrier to remove the solvent from the saturant without excessive curing of the same, applying a second reinforcement sheet and an upper carrier sheet on the saturated reinforcement, passing the resultant assembly between heated pressure plates and intermittently pressing successively advanced portions of the assembly between the heated plates in a manner such as to provide each successive portion with a plurality of applications of heat and pressure to cause the saturant to distribute itself uniformly throughout both reinforcement sheets and to densify and cure the same, and then removing at least one of the carrier sheets.

3. In apparatus for producing sheet material, in combination, saturating means including a saturating roll and a cooperating doctor roll, means for continuously advancing a reinforcement sheet supported by a carrier sheet into the nip of the rolls, means for depositing a saturant onto the reinforcement sheet to be forced into the reinforcement sheet by the pressure of the rolls, said saturant depositing means including means for confining a large supply of saturant above the rolls to extend over a substantial part of the saturating roll and over a substantial portion of the reinforcement sheet supported on the doctor roll, a dryer through which the saturated reinforcement sheet assembly is passed for drying the sheet to remove the solvent from the saturant, means for applying an unsaturated reinforcing sheet and an upper carrier sheet on the saturated reinforcement sheet, means for cyclically applying heat and pressure to successive portions of the assembly to densify the reinforcement sheets, means for intermittently advancing said successive portions with relation to successive pressing cycles so as to provide each portion with a plurality of applications of heat and pressure and to cause the saturant to distribute itself uniformly throughout the various plies including the initially unsaturated sheet, and means for thereafter removing at least one of the carrier sheets.

4. In apparatus of the character described, in combination, saturating means including a saturating roll and a cooperating doctor roll, means for continuously advancing a reinforcement sheet supported on a carrier sheet into and through the nip of the saturating rolls, means for depositing a saturant on the reinforcement sheet, said saturant being confined between the rolls and in engagement with a portion of the saturating roll and in engagement with a portion of the reinforcement sheet supported on the doctor roll, means for drying the advancing sheet to remove the solvent from the saturant, means for applying a carrier sheet on the surface of the reinforcement sheet, means for cyclically applying heat and pressure to the assembly to densify the same, means for intermittently advancing said successive portions with relation to successive pressing cycles so as to provide each portion with a plurality of applications of heat and pressure and to cause the saturant to distribute itself uniformly throughout the reinforcement sheets, and means for removing at least one of the carrier sheets.

5. In apparatus for producing sheet material, in combination, saturating means including a saturating roll and a cooperating doctor roll, means for continuously advancing a reinforcement sheet supported by a carrier sheet into the nip of and through the rolls, means for flooding a saturant onto said reinforcement sheet and between the sheet and the saturating roll to be forced into the sheet by the pressure of the rolls, means for adjusting the nip gap setting between said rolls to control the amount of saturant added to the reinforcement sheet to provide a uniform thickness of the same, means cooperating with said roll and in engagement with said carrier sheet for guiding and maintaining the reinforcement sheet around the underside of the saturating roll, said assembly being maintained under a constant tension by said advancing means, a scraper for releasing the continuously advancing assembly from the saturating roll and for removing any saturant remaining on the roll, said guiding means having portions cooperating with said scraper to maintain said uniform thickness, a dryer through which the saturated reinforcement sheet and the carrier are passed to dry the same to remove the solvent from the saturant, means for applying an unsaturated reinforcement sheet on top of said saturated reinforcement sheet after passing through the dryer, means for applying an upper carrier sheet on said unsaturated sheet, a cyclically operated press for applying heat and pressure to successive portions of the assembled sheets and webs advanced therethrough to densify and thermoset the webs and the saturant, means for intermittently advancing said successive portions with relation to successive pressing cycles so as to provide each portion with a plurality of applications of heat and pressure and to cause the saturant to distribute itself uniformly throughout the reinforcement sheets, and windup rolls for removing the upper and lower carrier sheets.

6. In apparatus for producing sheet material, in combination, saturating means including a saturating roll and a cooperating doctor roll, means for advancing a reinforcement sheet supported by a lower carrier sheet into the nip of and through the rolls, means for depositing a saturant onto said reinforcement sheet between the sheet and the saturating roll to be forced into the sheet by the pressure of the rolls, means for adjusting the nip gap setting between said rolls to control the amount of saturant added to the reinforcement and to control the thickness of the assembly, means for guiding and maintaining the reinforcement sheet around the underside of the saturating roll including a member bearing against the assembly on the saturating roll, said member having a portion cooperating with a portion of the scraper to maintain said thickness during release of the assembly, said reinforcement and carrier sheets being maintained under a constant tension by said advancing means, a scraper for releasing the continuously advancing assembly from the saturating roll and for removing any saturant remaining on the roll, a dryer through which the saturated reinforcement and the carrier are passed to dry the same to remove the solvent from the saturant, means for applying an unsaturated reinforcement sheet on top of said saturated reinforcement sheet after passing through the dryer, means for applying an upper carrier sheet to the assembly, a cyclically operated press for applying heat and pressure to successive portions of the assembly advanced therethrough to densify and cure the saturated reinforcement to cause the saturant to distribute itself uniformly throughout the reinforcement sheets, and windup rolls for removing the upper and lower carrier sheets, the continuously advanced assembly forming a loop immediately in front of the press when the latter is closed, said winding means maintaining the assembly under tension to advance the same through the press when the latter is open, successive portions of the assembly being advanced through the press in an amount such as to provide each portion with a plurality of applications of heat and pressure.

7. The combination as defined in claim 6 wherein the saturating roll is driven, and wherein the assembly advancing means includes a pair of tension rolls.

8. The combination as defined in claim 7 which includes means for clamping the assembly leading from said tension rolls when the press is open whereby to prevent the tension of the windup rolls from being applied to the assembly preceding said tension rolls.

9. In apparatus of the character described, in combination, means for pressing a composite assembly of a saturated reinforcement sheet and a superimposed unsaturated reinforcement sheet confined between upper and lower carrier sheets comprising a cyclically operated press having upper and lower heated platens between which the assembly is advanced when the press is open and by which successive portions of the assembly are pressed to densify and cure the reinforcement sheet to cause the saturant to distribute itself uniformly throughout the reinforcement sheets when the press is closed, successive portions of the assembly being advanced through the press each cycle such as to provide each portion with a plurality of applications of heat and pressure, the engaging surfaces of said platens being provided with resilient sheet material to provide uniform pressure distribution.

10. The combination as defined in claim 9 which includes upper and lower secondary carrier sheets cooperating with and movable relative to the platens to prevent accumulation of dirt or excess saturant on the engaging surfaces of the platens.

11. The method of producing reinforced sheet material which comprises saturating a continuously advanced web of reinforcement supported by a carrier sheet, drying the resultant assembly to remove the solvent from the saturant without excessive curing thereof, and then cyclically applying heat and pressure to successive portions of the assembly in a manner such as to provide each successive portion with a plurality of applications of heat and pressure to densify the saturated reinforcement and to cause the saturant to distribute itself uniformly throughout the reinforcement sheet.

12. The method of producing reinforced sheet material which comprises saturating a continuously advanced web of reinforcement supported by a lower carrier sheet, drying the resultant assembly to remove the solvent from the saturant without excessive curing thereof, superimposing an upper carrier sheet onto the assembly, and then cyclically applying heat and pressure to successive portions of the assembly in a manner such as to provide each successive portion with a plurality of applications of heat and pressure to densify the saturated material and to cause the saturant to distribute itself uniformly throughout the reinforcement sheet.

13. In apparatus for producing sheet material, in combination, saturating means including a saturating roll and a cooperating doctor roll, means for advancing a reinforcement sheet supported by a carrier sheet into the nip of and through the rolls, means for flooding a saturant onto said reinforcement sheet and between the sheet and the saturating roll to be forced into the sheet by the pressure of the rolls, means for adjusting the nip gap setting between said rolls to control the amount of saturant added to the reinforcement sheet and to provide a uniform thickness of the same, means cooperating with said roll and in engagement with said carrier sheet for guiding and maintaining the reinforcement sheet around the underside of the saturating roll, said assembly being maintained under a constant tension by said advancing means, a scraper for releasing the continuously advancing assembly from the saturating roll, said guiding means having portions cooperating with said scraper to maintain said uniform thickness, and for removing any saturant remaining on the roll, a dryer through which the saturated reinforcement sheet and the carrier are passed to dry the same to remove the solvent from the saturant, means for applying an unsaturated reinforcement sheet on top of said saturated reinforcement sheet after passing through the dryer, means for applying an upper carrier sheet on said unsaturated sheet, a cyclically operated press for applying heat and pressure to successive portions of the assembled sheets and webs advanced therethrough to densify and thermoset the webs and the saturant and to cause the saturant to distribute itself uniformly throughout the reinforcement sheets, and windup rolls for removing the upper and lower carrier sheets, said means for guiding and maintaining the assembly comprising the reinforcement sheet and the carrier in engagement with the underside of the saturating roll including a curved shoe cooperating with the saturating roll and bearing against said carrier sheet, said shoe also cooperating with a portion of the scraper to effect clean removal of the assembly and to maintain said uniform thickness of the assembly during release of the assembly from the saturating roll.

14. The combination as defined in claim 13 wherein the dryer is arranged to cause heated air to flow over the saturated surface and to exhaust the heated air and fumes and to remove the solvents without excessive curing of the saturant.

15. In apparatus of the character described, in combination, means for combining a reinforcement sheet with a saturant comprising a saturating roll and a cooperating doctor roll, means for advancing the reinforcement sheet on a carrier sheet into the nip of the rolls, a dam containing a substantial amount of the saturant to extend over a substantial area of the reinforcement sheet supported on the doctor roll and over a substantial area of the saturating roll cooperating with the rolls to confine the saturant and cause it to flow into the nip and be forced into the reinforcement sheet by the pressure of the rolls, means for guiding and maintaining the reinforcement sheet around the underside of the saturating roll, and a scraper cooperating with the saturating roll for releasing the continuously advancing reinforcement sheet from the roll and for removing any saturant remaining on the roll, said means for guiding and maintaining the web around the underside of the saturating roll including a curved shoe cooperating with the roll and the scraper, said scraper having a straight blade portion and a concave guide portion extending outwardly from said blade portion, the trailing end of said guide portion terminating in a sharp edge to prevent accumulation of saturant thereon during removal of the web, said shoe having a concave portion bearing against the saturated assembly and the saturating roll and having a curved upper end conforming to the concave portion of the scraper and spaced therefrom a distance such as to effect clean removal of the web and to maintain a substantially uniform thickness thereof.

16. The combination as defined in claim 15 wherein the shoe is arranged to resiliently bear against the saturating roll, and wherein the shoe is adjustable to vary the space between the concave portion of the blade and the upper end of the shoe to accommodate different thicknesses of reinforcement sheets.

17. In apparatus for producing sheet material, in combination, saturating means including a saturating roll and a cooperating doctor roll, means for continuously advancing a reinforcement sheet supported by a carrier sheet into the nip of the rolls, means for depositing a saturant onto the reinforcement sheet to be forced into the reinforcement sheet by the pressure of the rolls, a dryer through which the saturated reinforcement sheet assembly is passed for drying the sheet to remove the solvent from the saturant, means for applying an upper carrier sheet on the saturated reinforcement sheet, means for cyclically applying heat and pressure to successive portions of the assembly, and means for intermittently advancing said successive portions with relation to successive pressing cycles so as to provide each portion with a plurality of applications of heat and pressure.

References Cited by the Examiner

UNITED STATES PATENTS

| | | | |
|---|---|---|---|
| 1,042,129 | 10/1922 | Leisel | 156—389 |
| 2,368,111 | 1/1945 | Burton | 156—323 |
| 2,392,695 | 1/1946 | Rohdin | 156—537 |
| 2,496,911 | 2/1950 | Green | 156—323 |
| 2,624,068 | 1/1953 | Dobry | 156—389 X |
| 2,939,509 | 6/1960 | Hoffman | 156—324 X |
| 3,085,617 | 4/1963 | Sorg | 156—247 X |
| 3,094,453 | 6/1963 | Scherer | 156—323 X |

EARL M. BERGERT, *Primary Examiner.*